United States Patent [19]

Credali et al.

[11] Patent Number: 4,500,594

[45] Date of Patent: Feb. 19, 1985

[54] PROCESS FOR PREPARING MULTILAYER FIBROUS STRUCTURES AND PRODUCT

[75] Inventors: Lino Credali, Casalecchio di Reno; Emilio Martini, Pontecchio Marconi; Domenico Lori, Ferrara, all of Italy

[73] Assignee: Montedison S.p.A., Milan, Italy

[21] Appl. No.: 588,775

[22] Filed: Mar. 12, 1984

Related U.S. Application Data

[63] Continuation of Ser. No. 407,277, Aug. 11, 1982, abandoned.

[30] Foreign Application Priority Data

Aug. 14, 1981 [IT] Italy ................. 23519 A/81

[51] Int. Cl.$^3$ .................. D21H 1/02; B32B 21/06; B32B 23/06
[52] U.S. Cl. .................. 428/284; 156/62.2; 156/62.8; 156/313; 156/309.6; 162/123; 162/132; 428/513; 428/534
[58] Field of Search ............ 156/62.2, 62.8, 313, 156/309.6, 296; 428/284, 534, 535, 296, 513; 162/123, 124, 127, 132

[56] References Cited

U.S. PATENT DOCUMENTS

| | | | |
|---|---|---|---|
| 2,077,016 | 4/1937 | Schacht | 162/127 |
| 2,500,282 | 3/1950 | Francis | 156/62.2 |
| 3,256,138 | 6/1966 | Welch | 162/124 |
| 3,501,369 | 3/1970 | Drelich et al. | 156/296 |
| 3,560,324 | 2/1971 | Quackenbush | 428/296 |
| 3,684,643 | 8/1972 | Stepp | 156/309.6 |
| 3,790,417 | 2/1974 | Patterson | 156/62.8 |
| 3,935,047 | 1/1976 | Shinomura | 156/163 |
| 4,081,582 | 3/1978 | Butterworth | 428/284 |
| 4,212,703 | 7/1980 | D'Amico et al. | 162/132 |
| 4,318,774 | 3/1982 | Powell | 162/132 |

Primary Examiner—Michael Ball

[57] ABSTRACT

Composite sheets comprising a layer of cellulosic fibers and a layer adjacent thereto consisting in whole or in part of thermoplastic fibers are made to adhere by superimposing the sheets on the side of the cellulosic fibers layer and by inserting between such layers a film of a thermoplastic polymer having:

(a) a melting temperature lower than the melting temperature of the polymer forming the thermoplastic synthetic fibres contained in the layer adjacent to the cellulosic layer, intended for the adhesion, of the composite sheet;

(b) a viscosity in the molten state—measured in a capillary viscosimeter, at a velocity gradient equal to or lower than $10^{-1}$ seconds, and at a temperature comprised between a temperature higher by 10° C. than the melting temperature of such polymer and a temperature higher by 20° C. than the melting temperature of the abovesaid thermoplastic fibres—lower than $1 \cdot 10^8$ poises, and preferably lower than $1 \cdot 10^5$ poises;

(c) a surface tension not exceeding by more than 5 dynes/cm the surface tension of the polymer forming such thermoplastic fibres, measured at the same temperature;

(d) a solubility parameter, at a temperature of 25° C., in a ratio of from 0.8 to 1.15, extremes included, to the solubility parameter of the polymer forming such thermoplastic fibres; and by heating the whole at a temperature ranging from a temperature exceeding by 10° C. the melting temperature of the polymer forming such film to a temperature exceeding by 20° C. the melting temperature of the polymer forming the synthetic fibres existing in the layer which is adjacent to the cellulosic fibre layer, intended for the adhesion, of the composite sheet.

13 Claims, No Drawings

PROCESS FOR PREPARING MULTILAYER FIBROUS STRUCTURES AND PRODUCT

This is a continuation of application Ser. No. 407,277, filed Aug. 11, 1982, now abandoned.

BACKGROUND OF THE INVENTION

The bonding or lamination of more sheets of paper or paperboard, either with each other or with sheets or films of non-cellulosic materials is a commonly utilized technique, especially in the preparation of materials for packaging, for obtaining composite sheets having the combined properties of the two or more component sheets, or for preparing sheets endowed with a high weight, not directly obtainable by papermaking machines.

According to the conventional techniques, such bonding is accomplished by applying an adhesive on the surfaces of the sheets and then by laminating the superimposed sheets in a press or between rollers, in order to achieve the adhesion between the component sheets. Such technologies exhibit some limits due to the type of adhesive to be used in relation to the nature of the sheets and to the high temperatures required, which cause degradation of the cellulose or of the other types of fibres which may be present.

More recently, the availability on the market of thermoplastic synthetic fibres capable of fully or partially replacing the cellulose in the preparation of paper sheets or articles has enabled to prepare bonded or laminated articles of the type described hereinbefore starting from sheets containing more or less high percentages of such fibres. These sheets are superimposed, then heated and compressed at a temperature higher than the melting temperature of the synthetic fibres contained therein, which, by consequence, act as bonding agents between the various layers.

This method, which may be defined as thermowelding method, exhibits however the drawback of requiring too high operating temperatures, generally exceeding by 20°-30° C. the melting temperature of the polymer which forms the thermoplastic synthetic fibres contained in the sheets.

That happens because it is necessary, for purposes of adhesion, that the molten polymer should possess a certain mobility or flowability under the conditions in which it is operated.

Such high temperatures are generally prejudicial to the mechanical characteristics of the cellulosic fibres, if any, present in the sheets; furthermore said high temperatures do not permit to prevent a complete melting of the remaining thermoplastic fibres contained in the structure and not interested in the adhesion between the sheets, what results in the loss of their fibrous morphology.

Another drawback caused by the necessity of operating at such high temperature resides in the fact that, under such conditions, a certain worsening of the mechanical properties of the sheets occurs, especially in the flexural modulus, what proves to be particularly disadvantageous when the sheets must retain, at such temperatures, a preassigned shape, obtained for example by preceding drawing, embossing and the like.

THE PRESENT INVENTION

The object of this invention is to provide a process for preparing bonded articles by thermowelding sheets or layers of cellulosic fibers which does not have the drawbacks and disadvantages of the previously known processes, such process comprising the following steps:

(1) preparing composite sheets consisting of at least two layers, one of which of cellulosic fibres and the other, adjacent to the first one, formed by fibres of a thermoplastic synthetic polymer, or of blends of such fibres with up to 95% by weight of cellulosic fibres;

(2) superimposing two of such sheets on the side of the cellulosic fibre layer, with inserted between them a film of at least a thermoplastic polymer having the following characteristics:

(a) a melting temperature lower than the melting temperature of the polymer constituting the thermoplastic synthetic fibres contained in the layer adjacent to the one consisting of cellulosic fibres;

(b) a viscosity in the molten state, measured in a capillary viscosimeter, at a velocity gradient lower than or equal to $10^{-1}$ seconds and at a temperature comprised between a temperature higher by 10° C. than the melting temperature of such thermoplastic polymer and a temperature higher by 20° C. than the melting temperature of the polymer forming such thermoplastic synthetic fibres, lower than $1.10^8$ poises;

(c) a surface tension not exceeding by more than 5 dynes/cm the one of the polymer constituting such thermoplastic synthetic fibres, measured at the same temperature;

(d) a solubility parameter which is in a ratio to the solubility parameter of the thermoplastic polymer constituting such synthetic fibres ranging from 0.85 to 1.15, extremes included, at a temperature of 25° C.;

(3) heating the aggregate of the so superimposed sheets and film at a temperature ranging from a temperature exceeding by 10° C. the melting temperature of the polymer forming the film to a temperature exceeding by 20° C. the melting temperature of the polymer forming such thermoplastic fibres;

(4) compressing the aggregate at a temperature within such range.

The presence of a film having such characteristics, interposed or inserted between the two cellulosic fibre layers, to be caused to adhere, of the composite sheets, along with the presence of the thermoplastic fibre layers, directly adjacent to the two cellulosic layers, permits to attain the adhesion between two surfaces or layers consisting of cellulose fibres, at lower temperatures, or, the temperature being equal, to obtain higher adhesion values than the ones obtained when accomplishing the adhesion between cellulosic sheets or layers as such by means of thermomelting of a generic thermoplastic film inserted therebetween.

In particular it is possible, and even preferable, when following the method illustrated hereinabove, to operate between a temperature higher by 10° C. than the melting temperature of the polymer constituting the film, and a temperature equal to the melting temperature of the polymer forming the thermoplastic fibres contained in the second layer of the individual composite sheets, when the melting temperature of the polymer that constitutes the film is lower by at least 10° C. than the melting temperature of the polymer that forms such fibres.

With temperature values within such preferred range it is possible to achieve the adhesion even at temperatures below the melting temperatures of such thermoplastic fibres, therefore without destroying the morphology thereof.

As to the fibrous material present in the abovesaid second layer of the composite sheets intended for adhesion, it may consist of synthetic fibres only of at least a thermoplastic polymer, or of blends of such fibres with up to 95% by weight—referred to the total fibre blend—of cellulosic fibres.

Mineral fillers, pigments and the additive usually utilized in the conventional cellulosic papers may be present in both layers which conssitute each sheet, admixed to the constituting fibrous material.

Of course, the composite sheets to be caused to adhere by means of their cellulose layers may consist of more than the two fibrous layers described hereinbefore, provided that in each of such composite sheets there is present an outer layer formed by cellulose fibres only (which is the layer intended for adhesion) and, directly adjacent to such layer, a layer consisting of fibres of a thermoplastic synthetic polymer, or of a mixture of such fibres with up to 95% by weight of cellulosic fibres.

The remaining layers constituting the composite sheet may be indifferently formed by synthetic fibres, either thermoplastic or not thermoplastic, or of cellulosic fibres only, or of blends of such fibres in any ratio.

As for the thermoplastic film to be inserted between the cellulosic layers of the composite sheets, it must have a thickness of at least $20\mu$, generally a thickness ranging from $20\mu$ to $200\mu$.

Particularly advantageous adhesion conditions, owing to both the low temperatures employed and the adhesion values obtained, are generally achieved by operating with sheets in which the layer of cellulosic fibres only, intended for adhesion, has a weight ranging from 40 to 120 $g/m^2$ at values of apparent density comprised between 0.6 and 0.8 g/cc, and with a thermoplastic film inserted between the cellulosic layers of the two sheets, having a thickness ranging from 20 to $40\mu$.

Density values of the cellulosic fibre layer comprised between 0.6 and 0.8 g/cc are obtainable by carrying out a suitable refining of the cellulosic fibres utilized to the purpose, according to known techniques.

The weight of the layer of the sheet consisting of, or containing at least 5% by weight of thermoplastic fibres, shall be equal to at least 20 $g/m^2$, being preferably comprised between 40 and 120 $g/m^2$.

The composite sheets can be prepared according to conventional papermaking methods starting from dispersions in water, or in another inert liquid, of cellulosic fibres, or of thermoplastic synthetic fibres, or of blends thereof, by using the flat-table continuous machines or continuous machines with round molds. Aqueous suspensions containing from 0.7 to 1.5% by weight of fibrous material are preferably employed.

Thus, it is the object of the present invention to provide a process for preparing bonded articles by thermowelding of sheets of cellulosic fibres which comprises the following steps:

(1) Preparing composite sheets comprising at least two layers, one of which of cellulosic fibres and the other, adjacent to the first one, consisting of fibres of a thermoplastic synthetic polymer, or of blends of such fibres with up to 95% by weight of cellulosic fibres;
(2) Superimposing two of such sheets on the side of their respective cellulosic fibre layers, a film of at least a thermoplastic polymer having the characteristics specified hereinafter being inserted between said two sheets:
  (a) a melting temperature lower than the melting temperature of the thermoplastic polymer forming the thermoplastic synthetic fibres contained in the layer adjacent to the one consisting of cellulosic fibres;
  (b) a viscosity in the molten state, measured in a capillary viscosimeter, at a velocity gradient lower than or equal to $10^{-1}$ seconds, and at a temperature comprised between a temperature higher by 10° C. than the melting temperature of such thermoplastic polymer and a temperature higher by 20° C. than the melting temperature of the polymer forming such thermoplastic synthetic fibres, lower than $1.10^8$ poises;
  (c) a surface tension not exceeding by more than 5 dynes/cm the surface tension of the polymer constituting such thermoplastic synthetic fibres, measured at an equal temperature;
  (d) a solubility parameter which is in a ratio of from 0.85 to 1.15, extremes included, to the solubility parameter of the thermoplastic polymer constituting such synthetic fibres, at a temperature of 25° C.;
(3) Heating the aggregate of the so superimposed sheets and film at a temperature ranging from a temperature exceeding by 10° C. the melting temperature of the polymer forming the film, to a temperature exceeding by 20° C. the melting temperature of the polymer forming such thermoplastic fibres;
(4) Compressing the whole at a temperature within such range.

Heating (3) and compression (4) operations may be accomplished simultanteously, in one step only.

As synthetic fibres to be used in the process according to this invention it is possible to utilize fibres of the conventional type in the form of staples, but preferably use is made of fibrils or fibrids of thermoplastic synthetic polymers, having a surface area of at least 1 $m^2/g$. Such fibrils or fibrids are products known since long as substituents in the manufacture of paper or of related products.

Their length generally ranges from 1 to 10 mm and their mean (apparent) diameter from 1 to $500\mu$.

The fibrils employable in the present process are obtainable according to any of the several processes described in literature.

In this connection mention is made of the methods described in British Pat. Nos. 868,651 and 1,287,917, and in German patent application No. 2,208,553, according to which the fibres in question, otherwise referred to as "fibrids", are prepared by precipitation of polymers from their solutions, or just during the polymerization of the monomers, by operating in the presence of cutting strengths; and furthermore in British Pat. Nos. 891,943 and 1,262,531, in U.S. Pat. Nos. 3,770,856, 3,750,383 and 3,808,091, in Belgian Pat. No. 789,808, in French Pat. No. 2,176,858 and in German patent application No. 2,343,543, according to which the aforesaid fibrils are obtained in the state of more or less coherent aggregates, or of fibrilled filamentary structures (plexofilaments) by extruding through a spinneret solutions, emulsions or dispersions of the polymers in one or more liquid media, in conditions of nearly instantaneous evaporation of the existing liquid phase (flash-spinning processes). In such case, the fibrous aggregates or plexofilaments so obtained can be easily disgregated into discontinuous or elementary fibrils, having a surface area of at least 1 m²/g, by means of cutting and/or refining operations.

Other methods by which it is possible to directly obtain fibrils employable in the process of the present invention are those described in Italian Pat. Nos. 947,919 and 1,030,809 in the name of the Applicant, as well as in British Pat. Nos. 1,355,912 and 1,355,913.

The thermoplastic fibres, and in particular such fibrils or fibrids, may contain incorporated therein inorganic fillers, such as kaolin, talc, titanium dioxide, etc. in amounts up to 70% by weight referred to the weight of the fibres so filled. Blends of such fibrils with thermoplastic fibres of the conventional type may be used as well.

As cellulose fibres it is possible to utilize all those usually employed for making papers of the conventional type, based on cellulose or on derivatives thereof. Natural fibres of a different type (for example wool, asbestos), and also glass fibres may be present in the layers of the composite sheets as partial substituents (less than 50%) of the cellulose fibres.

When the thermoplastic fibres which constitute, in whole or in part, the layer adjacent to the cellulosic fibre layer intended for adhesion are blends of fibres of different polymers, the polymer forming the film to be interposed between the sheets has to meet all the conditions from (a) to (d) defined hereinbefore, in respect of at least one of the type of thermoplastic fibres which are present (or of the polymer forming such fibres).

In the case that the individual thermoplastic fibres should be made of a mixture of polymers instead of one type only of polymer, what is specified at points (a) to (d) about the melting temperatures, the surface tension values and the solubility parameters of the polymers forming the fibres is to be understood as referred to the corresponding values possessed by such mixture of polymers.

The thermoplastic polymer constituting the film may be any film-forming thermoplastic polymer, preferably having a cristallinity of at least 20%, provided it exhibits the characteristics specified at points (a) to (d) in respect of the thermoplastic material forming the thermoplastic fibres present in the sheets.

Examples of polymers from which the film is preparable are the olefinic polymers, such as polyethylene and polypropylene, the vinyl polymers, such as polyvinyl chloride, polyvinyl alcohol, polyvinyl acetate, polymethylmethacrylate, polystyrene, and furthermore the polyamides, polytetrafluoroethylene, the polyester resins, and the mixtures of such polymers.

The melting temperature of the polymers is assumed to be the temperature at which the disappearance of the last crystallite in the polymer is observed under an optical microscope.

The solubility parameter of a polymer is expressed by the square root of the ratio between the cohesion energy of the molecules and the molar volume, and it is often used to determine the characteristics of compatibility of polymers and solvents.

General methods for such determination are described by J. Brandrup and E. H. Immergut in "Polymer Handbook", Intersc. Publisher, 1966, paragraph 4, pages 341 and following.

A particular determination method based on the principle of additivity of the contributions of the chemical groups, atoms and bonds present in the molecules to the total molar attraction forces was suggested and described by P. A. Small in Journal of Applied Chemistry 3, 77, 1953. Hereinbelow there are recorded the values of the solubility parameters at 25° C. of some polymers, which values are calculated according to P. A. Small and are referred to for the purposes of this invention.

| Polymer | Solubility $\sqrt{cal/cc}$ |
| --- | --- |
| Polyvinyl acetate | 9.22 |
| Polymethylmethacrylate | 9.22 |
| Polyethylene | 8.05 |
| Polystyrene | 9.01 |
| Polypropylene | 9.2 |
| Polytetrafluoroethylene | 6.2 |
| Polyvinyl alcohol | 12.6 |
| Polyvinyl chloride | 10.2 |

The thermoplastic polymer film is preparable according to any conventional methods used for the film-forming of the polymers, such as extrusion, casting, etc.

The thermoplastic synthetic fibres present in the layer adjacent to the cellulosic layer to be caused to adhere according to the process of the present invention are preferably prepared from thermoplastic polymers having at least 20% of crystallinity, such as low or high density polyethylene, polypropylene essentially consisting of isotactic macromolecules, ethylene/propylene copolymers, either statistical or in blocks, poly-4-methyl-1-pentene, polyamides, polyesters, polyacrylonitrile, polyurethanes, polycarbonates, vinyl resins such as polyvinyl chloride and polyvinyl acetate, ethylene/vinylacetate copolymers, acrylic resins in general, polyethers.

For heating operation (3), when it is accomplished in the absence of pressure, it is possible to use for example a hot-air tunnel or a hot cylinder. When it is operated under pressure, it is possible to use a press, or a calender consisting, for example, of a roller of hard material, for instance steel.

Preferably, but not necessarily, it is operated with calenders working at from 10 to 100 Kg/cm².

As mentioned hereinbefore, the temperature at which operation (3) is carried out ranges from a temperature exceeding by 10° C. the melting temperature of the polymer forming the film to a temperature exceeding, at the most, by 20° C. the melting temperature of the thermoplastic fibres present in the layer of the sheets which is adjacent to the cellulosic fibre layer intended for adhesion.

The actual temperature at which the treatment is accomplished shall be selected, in such range, from the temperatures at which the polymer constituting the film assumes the previously defined values of viscosity (b) and surface tension (c), in case such values do not take place at all the heating temperatures comprised in the above-mentioned range.

In such case the temperature at which the bonding according to operation (3) is to be carried out may be fixed on the basis of preliminary viscosity and surface tension determinations carried out on the polymer of the film.

The process object of the present invention permits to prepare papers and paperboards of any desired weight. Furthermore the papers so obtained—having the same weight as compared with the papers of cellulose only, or with mixed papers of cellulose/thermoplastic synthetic fibres, which have been subjected to heat treatment till melting of the synthetic fibres—exhibit higher mechanical properties in dry conditions, though retaining the same thermoforming properties of the latter, even at a higher weight.

This process can be also utilized, with the same substantial advantages, for bonding composite sheets in which the thermoplastic synthetic fibres contained in the layer adjacent to the cellulosic layer intended for adhesion, have been previously thermo-molden (prior to their superimposition) by heating and optional simultaneous or successive compression of the sheets, and have therefore lost their fibrous morphology.

The following examples are given to illustrate the present invention, without being however a limitation thereof.

EXAMPLE 1

By means of a two-jet papermaking machine, and using respectively:
(a) an aqueous dispersion at 4% of Kraft cellulose, refined up to 23° SR,
(b) an aqueous dispersion at 4% of a fibre blend consisting for 35% by weight of Kraft cellulose and for 65% by weight of fibrils of high-density polyethylene (having a melting temperature of 135° C.), such fibrils having a mean weighted length of 3 mm, an apparent diameter of $17\mu$ and a surface area of 6 m$^2$/g, and the surface thereof having been pretreated, to promote the dispersibility in water, with acetalized polyvinyl alcohol according to the process described in Italian Pat. No. 1,006,878, two composite sheets were prepared, each consisting of a cellulosic fibre layer having, after drying, a weight of 100 g/m$^2$ and a thickness of $160\mu$ (corresponding to a density of 0.625 g/cc), and of a layer constituted of polyethylene fibrils blended with cellulosic fibres, such layer having, after drying, a weight of 80 g/m$^2$ and a thickness of $145\mu$.

The composite sheets were superimposed on the side consisting of the layer of cellulose fibre only, after having inserted between the two layers a film, of identical sizes, consisting of low-density polyethylene (density = 0.906) having a melting temperature of 110° C., such film having a thickness of $20\mu$. Such polyethylene exhibited, in a temperature range of from 120° C. to 155° C., a viscosity below 0.8-10$^5$ poises, measured in a capillary viscosimeter, at a velocity gradient lower than or equal to 10$^{-1}$ seconds, and furthermore a surface tension equal to the one of the high-density polyethylene forming the fibrils, as well as a solubility parameter in a ratio of 0.98 to the one of the polymer of the fibrils.

The complex of the sheets and film was made to pass through a heating tunnel wherein it was brought to a temperature of 135° C. and while being at such temperature it was then conveyed, at a speed of 10 m/min., between the two rollers of a calender (one of which made of rubber having a hardness equal to 80° Shore, and the other made of steel), where the complex was subjected to a pressure of 100 Kg/cm.

The resulting product was then subjected to the adhesion test between the component sheets. To this purpose, a sample strip of the product, having a width of 5 cm and a length of 180 cm, was opened in proximity of an edge by detaching the sheets, and the resulting edge was drawn at a speed of 10 cm/min. in order to separate 10 cm of a sheet from the other sheet, the strength necessary therefor having been recorded. In the present case such strength resulted to be of 200 g/cm.

EXAMPLE 2

Sheets were prepared, each of them consisting of:
a layer of Kraft cellulose fibres, having a weight equal to 80 g/m$^2$ and a thickness of $127\mu$ (corresponding to a density of 0.625);
a layer of Kraft cellulose fibres, having a weight equal to 100 g/m$^2$ and a thickness of $160\mu$ (density = 0.625).

Two of such sheets were superimposed on the side of the layer having the higher weight, a polyethylene film analogous with the one utilized in example 1 having been inserted between the two layers.

The thermoadhesion was then accomplished according to the same modalities as described in such example, thus obtaining a bonded article exhibiting an adhesion strength of 50 g/cm. The thermoadhesion operation was repeated under the same conditions, but at a speed in the calender of 1 m/min.; the resulting adhesion strength was of 60 g/cm.

What I claim is:
1. A process for bonding, by means of thermoadhesion, sheets or layers of cellulosic fibres, which comprises the following steps:
(1) preparing composite waterlaid sheets consisting of at least two layers, one consisting essentially of cellulosic fibres and the other, adjacent to the first one, formed by fibres of a thermoplastic synthetic polymer, or of blends of such fibres with up to 95% by weight of cellulosic fibres;
(2) superimposing two of such sheets on the side of the essentially cellulosic fibre layer, with inserted between them a film of at least a thermoplastic polymer having the following characteristics:
(a) a melting temperature lower than the melting temperature of the polymer constituting the thermoplastic synthetic fibres contained in the layer adjacent to the one consisting of cellulosic fibres;
(b) a viscosity in the molten state, measured in a capillary viscosimeter, at a velocity gradient lower than or equal to 10$^{-1}$ seconds and at a temperature comprised between a temperature higher by 10° C. than the melting temperature of such thermoplastic polymer and a temperature higher by 20° C. than the melting temperature of the polymer forming such thermoplastic synthetic fibres, lower than 1.10$^8$ poises;
(c) a surface tension not exceeding by more than 5 dynes/cm the one of the polymer constituting such thermoplastic synthetic fibres, measured at the same temperature;
(d) a solubility parameter which is in a ratio to the solubility parameter of the thermoplastic polymer constituting such synthetic fibres ranging from 0.85 to 1.15, extremes included, at a temperature of 25° C.;
(3) heating the aggregate of the so superimposed sheets and film at a temperature ranging from a temperature exceeding by 10° C. the melting temperature of the polymer forming the film to a temperature exceeding by 20° C. the melting temperature of the polymer forming such thermoplastic fibres;
(4) compressing the aggregate at a temperature within such range.
2. The process according to claim 1, in which the heating and/or compression operation of the aggregate is accomplished at a temperature ranging from a temperature higher by 10° C. than the melting temperature of the polymer forming the film to the melting tempera- ture of the polymer forming such thermoplastic synthetic fibres when the melting temperature of the film polymer is lower by at least 10° C. than the melting temperature of the polymer of such fibres.

3. The process according to claims 1 and 2, in which such thermoplastic synthetic fibres are at least in part in the form of fibrils having a surface area of at least 1 m$^2$/g.

4. The process according to claim 1, in which the viscosity in the molten state of the thermoplastic polymer is lower than $1.10^5$ poises.

5. The process according to claim 1, in which the thermoplastic polymer constituting the film is polyethylene.

6. The process according to claim 1, in which the thermoplastic polymer constituting the film is low-density polyethylene, and the thermoplastic synthetic fibres contained in the layer adjacent to the cellulose fibre layer to be made to adhere are high-density polyethylene fibrils having a surface area of at least 1 m$^2$/g.

7. The process according to claim 6, in which heating operation (3) and/or compressione operation (4) are carried out at a temperature ranging from about 120° to about 135° C.

8. The process according to claim 1, in which the thermoplastic polymer constituting the film is high-density polyethylene, and the thermoplastic synthetic fibres contained in the layer adjacent to the cellulosic fibre layer to be made to adhere are polypropylene fibrils having a surface area of at least 1 m$^2$/g.

9. The process according to claim 8, in which heating operation (3) and/or compression operation (4) are conducted at a temperature ranging from 145° C. to 165° C.

10. The process according to claim 1, in which the sheets utilized for superimposition operation (2) have been previously subjected to heating, and optionally to compression, with melting of the thermoplastic synthetic fibres present the rein.

11. The process according to claim 1, in which the cellulosic fibre layer present in the composite sheets has a weight of from 40 to 120 g/m$^2$ and a density of from 0.6 to 0.8 g/cc.

12. The process according to claim 1, in which the layer containing the thermoplastic synthetic fibres, which is present in the composite sheets and is adjacent to the cellulosic fibre layer intended for adhesion, has a weight comprised between 40 and 120 g/m$^2$.

13. Bonded articles obtained by the process according to claim 1.

* * * * *